(12) United States Patent
Zhang et al.

(10) Patent No.: US 12,732,775 B2
(45) Date of Patent: Sep. 8, 2026

(54) METHOD AND APPARATUS FOR UPLOADING AND ACQUIRING FEATURES OF WIRELESS SIGNALS

(71) Applicant: RAJAX NETWORK TECHNOLOGY (SHANGHAI) CO., LTD., Shanghai (CN)

(72) Inventors: Yan Zhang, Shanghai (CN); Hao Xia, Shanghai (CN); Guobin Shen, Shanghai (CN)

(73) Assignee: RAJAX NETWORK TECHNOLOGY (SHANGHAI) CO., LTD., Shanghai (CN)

( * ) Notice: Subject to any disclaimer, the term of this patent is extended or adjusted under 35 U.S.C. 154(b) by 307 days.

(21) Appl. No.: 18/547,820

(22) PCT Filed: Feb. 22, 2022

(86) PCT No.: PCT/CN2022/077210
§ 371 (c)(1),
(2) Date: Aug. 24, 2023

(87) PCT Pub. No.: WO2022/179485
PCT Pub. Date: Sep. 1, 2022

(65) Prior Publication Data
US 2024/0147188 A1 May 2, 2024

(30) Foreign Application Priority Data
Feb. 24, 2021 (CN) ......................... 202110206388.0

(51) Int. Cl.
*H04W 4/021* (2018.01)
*H04W 84/12* (2009.01)

(52) U.S. Cl.
CPC ............ *H04W 4/021* (2013.01); *H04W 84/12* (2013.01)

(58) Field of Classification Search
CPC ..... H04W 4/021; H04W 4/029; H04W 24/00; H04W 64/006; H04W 84/12; H04B 17/30
(Continued)

(56) References Cited

U.S. PATENT DOCUMENTS 8,266,008 B1 * 9/2012 Siegel ................ G06Q 30/0611 705/26.1
10,210,689 B1 * 2/2019 Cermak ............ G07C 9/00571
(Continued)

FOREIGN PATENT DOCUMENTS

CN 105101084 A 11/2015
CN 109218987 A 1/2019
(Continued)

OTHER PUBLICATIONS

CN202110757294.2—First Office Action mailed on Feb. 29, 2024, 19 pages.
(Continued)

*Primary Examiner* — Jean A Gelin
(74) *Attorney, Agent, or Firm* — Getech Law LLC; Jun Ye

(57) ABSTRACT

The present disclosure provides a method and apparatus for uploading and acquiring features of wireless signals. The method for acquiring features is applied to a service end and includes: acquiring a signal feature set of wireless signals detected by a delivery party in an execution process of at least one delivery service, where delivered objects corresponding to the at least one delivery service are from a same pick-up place; identifying a target feature subset corresponding to an object pick-up stage in the signal feature set, wherein the object pick-up stage is a stage of the execution process after the delivery party arrives at the pick-up place and before the delivery party leaves the pick-up place; based
(Continued)

Acquire a signal feature set of wireless signals detected by a delivery party in an execution process of at least one delivery service, wherein delivered objects corresponding to the at least one delivery service are from a same pick-up place — 202

Identify a target feature subset corresponding to the object pick-up stage in the signal feature set, where the object pick-up is a stage of the execution process after the delivery party arrives at the pick-up place and before the delivery party leaves the pick-up place — 204

Based on the target feature subset, determine signal features of the wireless signals corresponding to the pick-up place — 206 on the target feature subset, determining signal features of wireless signals corresponding to the pick-up place.

16 Claims, 6 Drawing Sheets

(58) Field of Classification Search
USPC .......................................................... 370/338
See application file for complete search history.

(56) References Cited

U.S. PATENT DOCUMENTS

| | | | | |
|---|---|---|---|---|
| 2012/0040653 | A1 | 2/2012 | Mendis | |
| 2015/0081480 | A1* | 3/2015 | Narita | G06Q 10/083 705/28 |
| 2017/0272181 | A1* | 9/2017 | Gudi | H04B 17/26 |
| 2018/0018626 | A1* | 1/2018 | Kagawa | G06Q 10/0833 |
| 2018/0129307 | A1* | 5/2018 | Ju | G01L 5/0038 |
| 2018/0130118 | A1* | 5/2018 | Guran | G06Q 20/4014 |
| 2018/0365641 | A1* | 12/2018 | Zhu | G06K 7/1417 |
| 2019/0019146 | A1* | 1/2019 | Chraibi | G08G 1/202 |
| 2019/0080286 | A1* | 3/2019 | Srinivasan | G06Q 30/018 |
| 2019/0182625 | A1* | 6/2019 | Haski | H04W 4/029 |
| 2019/0244448 | A1* | 8/2019 | Alamin | G07C 9/00896 |
| 2019/0287071 | A1 | 9/2019 | Sundar et al. | |
| 2019/0373423 | A1* | 12/2019 | Li | G06F 3/147 |
| 2020/0204548 | A1* | 6/2020 | Song | H04W 12/06 |
| 2020/0307649 | A1* | 10/2020 | Suzuki | G06Q 30/0207 |
| 2021/0103887 | A1* | 4/2021 | Phillips | G06Q 10/0833 |
| 2021/0312413 | A1* | 10/2021 | Bell | G06Q 20/14 |
| 2022/0018665 | A1* | 1/2022 | Albada | G06Q 30/0201 |
| 2022/0237072 | A1* | 7/2022 | Medisetty | G06F 11/076 |

FOREIGN PATENT DOCUMENTS

| | | | | | |
|---|---|---|---|---|---|
| CN | 109275090 | A | | 1/2019 | |
| CN | 109874112 | A | | 6/2019 | |
| CN | 110276850 | A | | 9/2019 | |
| CN | 110475014 | A | | 11/2019 | |
| CN | 110688589 | A | | 1/2020 | |
| CN | 111615048 | A | | 9/2020 | |
| CN | 111915250 | A | | 11/2020 | |
| CN | 111954175 | A | | 11/2020 | |
| CN | 112184054 | A | | 1/2021 | |
| CN | 112566033 | A | | 3/2021 | |
| KR | 20200057989 | A | * | 5/2020 | G06Q 30/016 |
| KR | 102273932 | B1 | * | 7/2021 | G06Q 30/0278 |

OTHER PUBLICATIONS

CN2021102063880.0—First Office Action mailed on Apr. 1, 2021, 9 pages.

PCT/CN2022/077210—International Search Report and Written Opinion mailed on Apr. 29, 2022, 14 pages.

* cited by examiner

METHOD AND APPARATUS FOR UPLOADING AND ACQUIRING FEATURES OF WIRELESS SIGNALS

CROSS-REFERENCE TO RELATED APPLICATIONS

This application is a national phase application based on International Application No. PCT/CN2022/077210, filed on Feb. 22, 2022, which claims priority to the Chinese Patent Application No. 2021102063880, filed on Feb. 24, 2021. The entire content of the related applications are incorporated herein by reference.

TECHNICAL FIELD

The present disclosure relates to the field of communication technologies, and in particular to a method and apparatus for uploading and acquiring features of wireless signals.

BACKGROUND

The WiFi technology is widely applied to various large and small venues such as households, hotels, coffee houses, airports and shopping malls. For these applications scenarios, behaviours of users such as arriving at or leaving a place or the like can be automatically detected by WiFi fingerprint data. With a business district Point of Interest (POI) as an example, behaviours of users such as arriving at or leaving an entity shop in a business district can be determined by the WiFi fingerprint data of the shop.

In the related arts, mounting of the WiFi fingerprint data of the business district POI is mainly dependent on manual collection, leading to high costs, low coverage rate and low accuracy.

SUMMARY

In view of the above, one or more embodiments of the present disclosure provide a method and apparatus for uploading and acquiring features of wireless signals.

In order to achieve the above object, one or more embodiments of the present disclosure provide the following technical solutions.

According to a first aspect of one or more embodiments of the present disclosure, there is provided a method for acquiring features of wireless signals, which is applied to a service end and includes:

- acquiring a signal feature set of wireless signals detected by a delivery party in an execution process of at least one delivery service, wherein delivered objects corresponding to the at least one delivery service are from a same pick-up place;
- identifying a target feature subset corresponding to an object pick-up stage in the signal feature set, wherein the object pick-up stage is a stage of the execution process after the delivery party arrives at the pick-up place and before the delivery party leaves the pick-up place;
- based on the target feature subset, determining signal features of the wireless signals corresponding to the pick-up place.

Optionally, the signal feature set includes a plurality of feature sequences which are acquired by detecting a feature value of each wireless signal in a preset feature dimension based on a preset detection period; identifying the target feature subset corresponding to the object pick-up stage in the signal feature set includes:

- determining a similarity between each feature sequences in the signal feature set, and based on the similarities, determining a distribution of the feature sequences; wherein a distribution density of the feature sequences is positively correlated with a corresponding similarity;
- determining a feature subset with the feature sequences of which the distribution density is highest in the signal feature set as the target feature subset.

Optionally, determining the similarity between each feature sequence in the signal feature set, and based on the similarities, determining the distribution of the feature sequences include: based on the feature values included in each feature sequence, forming a corresponding feature matrix, and calculating a distance between each feature matrix to establish an association relationship for the corresponding feature sequences, the distance between the feature matrices of the corresponding feature sequences being within a distance threshold;

- determining the feature subset with the feature sequences of which the distribution density is highest in the signal feature set as the target feature subset includes: based on the established association relationship, performing graph construction to acquire a network graph and determining a community of the network graph, wherein the feature sequences included in the community form the target feature subset.

Optionally, the signal feature set includes a plurality of feature sequences which are acquired by the delivery party by detecting a feature value of each wireless signal in a preset feature dimension based on a preset detection period; based on the target feature subset, determining the signal features of the wireless signals corresponding to the pick-up place includes:

- selecting a target feature sequence from the feature sequences comprised in the target feature subset;
- based on the feature values of the wireless signals included in the target feature sequence, representing the signal features of the wireless signals corresponding to the pick-up place.

Optionally, the feature sequences record a mapping relationship between a signal identifier of each detected wireless signal and a corresponding feature value; based on the feature values of the wireless signals included in the target feature sequence, representing the signal features of the wireless signals corresponding to the pick-up place includes:

- determining a target signal identifier of the wireless signals corresponding to the pick-up place;
- based on the mapping relationship recorded in the target feature sequence, determining a target feature value corresponding to the target signal identifier;
- based on the target feature value, representing the signal features of the wireless signals corresponding to the pick-up place.

Optionally, the method further includes: acquiring time information corresponding to the object pick-up stage and reported by the delivery party; wherein,

- based on the feature values of the wireless signals included in the target feature sequence, representing the signal features of the wireless signals corresponding to the pick-up place comprises: in response to that the detection period corresponding to the target feature sequence matches the time information, based on the feature values of the wireless signals comprised in the target feature sequence, representing the signal features of the wireless signals corresponding to the pick-up place.

Optionally, the wireless signals include a WiFi signal, and the feature dimension in which the delivery party detects the wireless signals includes a WiFi fingerprint, and the WiFi fingerprint includes a multipath structure of the WiFi signal and/or a signal strength of the WiFi signal.

According to a second aspect of one or more embodiments of the present disclosure, there is provided an event determination method, which includes:

acquiring signal features of wireless signals currently detected by a client of a user;

acquiring the signal features of the wireless signals corresponding to the pick-up place by the method in any one item of the first aspect;

in response to that the signal features of the wireless signals currently detected by the client match the signal features of the wireless signals corresponding to the pick-up place, determining occurrence of an arrival event that the user arrives at the pick-up place.

Optionally, the method further includes:

after the occurrence of the arrival event is determined, in response to that the signal features of the wireless signals currently detected by the client do not match the signal features of the wireless signals corresponding to the pick-up place, determining occurrence of an leave event that the user leaves the pick-up place.

According to a third aspect of one or more embodiments of the present disclosure, there is provided a method for uploading features of wireless signals, which is applied to a delivery party and includes:

acquiring corresponding signal features by detecting wireless signals in an execution process of at least one delivery service to form one signal feature set;

sending the signal feature set to a service end; wherein delivered objects corresponding to the at least one delivery service are from a same pick-up place, the signal feature set is used by the service end to select a target feature subset corresponding to an object pick-up stage and based on the target feature subset, determine signal features of the wireless signals corresponding to the pick-up place, and the object pick-up stage is a stage of the execution process after the delivery party arrives at the pick-up place and before the delivery party leaves the pick-up place;

According to a fourth aspect of one or more embodiments of the present disclosure, there is provided an apparatus for acquiring features of wireless signals, which is applied to a service end and includes:

a feature acquiring unit, configured to acquire a signal feature set of wireless signals detected by a delivery party in an execution process of at least one delivery service, wherein delivered objects corresponding to the at least one delivery service are from a same pick-up place;

an identifying unit, configured to identify a target feature subset corresponding to an object pick-up stage in the signal feature set, wherein the object pick-up stage is a stage of the execution process after the delivery party arrives at the pick-up place and before the delivery party leaves the pick-up place;

a determining unit, configured to, based on the target feature subset, determine signal features of the wireless signals corresponding to the pick-up place.

Optionally, the signal feature set includes a plurality of feature sequences which are acquired by detecting a feature value of each wireless signal in a preset feature dimension based on a preset detection period; the identifying unit is specifically configured to:

determine a similarity between each feature sequence in the signal feature set, and based on the similarities, distribute the feature sequences; wherein a distribution density of the feature sequences is positively correlated with a corresponding similarity;

determine a feature subset with the feature sequences having the highest density in the signal feature set as the target feature subset.

Optionally, the identifying unit is further configured to: based on the feature values included in each feature sequence, form a corresponding feature matrix, and calculate a distance between each feature matrix to establish an association relationship for the corresponding feature sequences, the distance between the feature matrices of the corresponding feature sequences being within a distance threshold;

based on the established association relationship, perform graph construction to acquire a network graph and determine a community of the network graph, wherein the feature sequences included in the community form the target feature subset.

Optionally, the signal feature set includes a plurality of feature sequences which are acquired by the delivery party by detecting a feature value of each wireless signal in a preset feature dimension based on a preset detection period; the determining unit is specifically configured to:

select a target feature sequence from the feature sequences included in the target feature subset;

based on the feature values of the wireless signals included in the target feature sequence, represent the signal features of the wireless signals corresponding to the pick-up place.

Optionally, the feature sequences record a mapping relationship between a signal identifier of each detected wireless signal and a corresponding feature value; the determining unit is further configured to:

determine a target signal identifier of the wireless signals corresponding to the pick-up place;

based on the mapping relationship recorded in the target feature sequence, determine a target feature value corresponding to the target signal identifier;

based on the target feature value, represent the signal features of the wireless signals corresponding to the pick-up place.

Optionally, the apparatus further includes: an information acquiring unit, configured to acquire time information corresponding to the object pick-up stage and reported by the delivery party;

the determining unit is further configured to: in response to that the detection period corresponding to the target feature sequence matches the time information, based on the feature values of the wireless signals included in the target feature sequence, represent the signal features of the wireless signals corresponding to the pick-up place.

Optionally, the wireless signals include a WiFi signal, and the feature dimension in which the delivery party detects the wireless signals includes a WiFi fingerprint, and the WiFi fingerprint includes a multipath structure of the WiFi signal and/or a signal strength of the WiFi signal.

According to a fifth aspect of one or more embodiments of the present disclosure, there is provided an event determination apparatus, which includes:

a first acquiring unit, configured to acquire signal features of wireless signals currently detected by a client of a user;

a second acquiring unit, configured to acquire the signal features of the wireless signals corresponding to the pick-up place by the method in any one item of the above first aspect;

a determining unit, configured to, in response to that the signal features of the wireless signals currently detected by the client match the signal features of the wireless signals corresponding to the pick-up place, determine occurrence of an arrival event that the user arrives at the pick-up place.

Optionally, the determining unit is further configured to:

after the occurrence of the arrival event is determined, in response to that the signal features of the wireless signals currently detected by the client do not match the signal features of the wireless signals corresponding to the pick-up place, determine occurrence of an leave event that the user leaves the pick-up place.

According to a sixth aspect of one or more embodiments of the present disclosure, there is provided an apparatus for uploading features of wireless signals, which is applied to a delivery party and includes:

a detecting unit, configured to detect wireless signals in an execution process of at least one delivery service to acquire corresponding signal features so as to form one signal feature set;

a sending unit, configured to send the signal feature set to a service end; wherein delivered objects corresponding to the at least one delivery service are from a same pick-up place, the signal feature set is used by the service end to select a target feature subset corresponding to an object pick-up stage and based on the target feature subset, determine signal features of the wireless signals corresponding to the pick-up place, and the object pick-up stage is a stage of the execution process after the delivery party arrives at the pick-up place and before the delivery party leaves the pick-up place.

According to a seventh aspect of one or more embodiments of the present disclosure, there is provided an electronic device, which includes:

a processor;

a memory for storing processor-executable instructions;

wherein the processor runs the executable instructions to perform the method of any one of the above embodiments.

According to an eighth aspect of one or more embodiments of the present disclosure, there is provided a computer readable storage medium, storing computer instructions, wherein the instructions are executed by a processor to perform the steps of any one of the methods in the above embodiments.

In the technical solutions of the present disclosure, the delivery party detects signal features of wireless signals in a process of executing a delivery service, where the execution process includes a stage of going to the pick-up place of the delivered objects, a stage of picking up the delivered objects after arriving at the pick-up place, and a stage of delivering the delivered objects after leaving the pick-up place. Due to limitation of the wireless signals in a signal range (not detected once beyond a specific range), for the stage of going to the pick-up place and the stage after leaving the pick-up place, the wireless signals detected by the delivery party is not the wireless signals corresponding to the pick-up place, but for a stage of picking up the above objects, the delivery party is in the pick-up place and thus can detect the wireless signals corresponding to the pick-up place. Therefore, the features of the wireless signals detected by the delivery party within the stage of picking up the objects can be taken as basis for determining the signal features of the wireless signals corresponding to the pick-up place. Hence, the signal feature set of the wireless signals detected by the delivery party in an execution process of at least one delivery service (the corresponding delivered objects are from a same pick-up place) may be acquired, and the target feature subset in the stage of picking up the objects is identified therefrom, and further, based on the target feature subset, the signal features of the wireless signals corresponding to the pick-up place are determined.

On one hand, in the above process of acquiring the wireless signal features, a deliveryman is not required to add extra operations when using the delivery party to make delivery, but the signal features of the detected wireless signals are uploaded by the delivery party. As a result, a normal delivery process of the deliveryman will not be affected. Thus, manual detection of the signal features can be avoided while normal execution of the delivery service is guaranteed. In this way, costs are reduced and the detection efficiency is improved.

On the other hand, as long as there is any delivery service to be executed by the delivery party in the pick-up place, the feature acquisition solution of the present disclosure can be used to acquire the signal features of the wireless signals of the pick-up place, which means the feature acquisition solution of the present disclosure can involve all pick-up places with delivery services, thereby improving the coverage rate.

DETAILED DESCRIPTION

Figure 1:
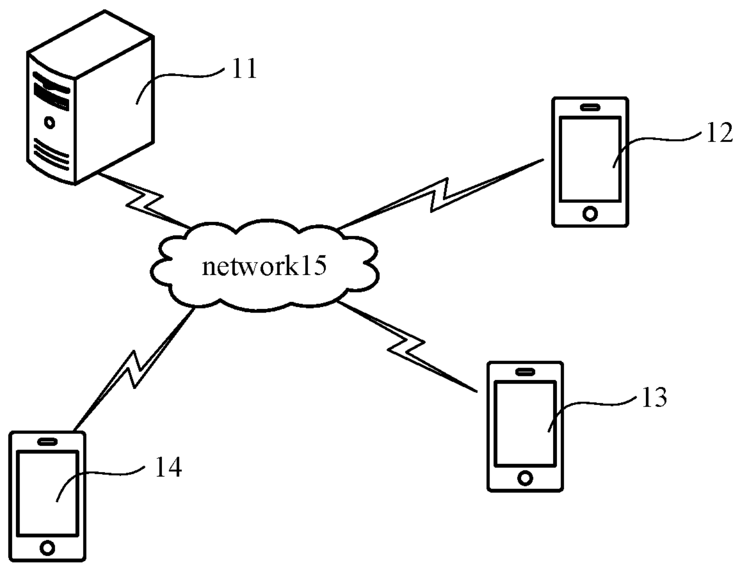
FIG. 1 is a schematic diagram illustrating an architecture of a system for acquiring features of wireless signals according to an exemplary embodiment of the present disclosure.

Exemplary embodiments will be described in detail herein, with the illustrations thereof represented in the drawings. When the following descriptions involve the drawings, like numerals in different drawings refer to like or similar elements unless otherwise indicated. The implementations described in the following embodiments do not represent all implementations consistent with one or more embodiments of the present disclosure. Rather, they are merely examples of apparatuses and methods consistent with some aspects of one or more embodiments of the present disclosure as detailed in the appended claims.

It is noted that in other embodiments, the steps of the corresponding methods are not necessarily performed in a sequence shown in the present disclosure. In some other embodiments, the steps included in the methods may be more or less than described in the present disclosure. Further, the single step described in the present disclosure may be decomposed into several steps in other embodiments; several steps in the present disclosure may be combined into a single step in other embodiments.

FIG. 1 is a schematic diagram illustrating an architecture of a system for acquiring features of wireless signals according to an exemplary embodiment of the present disclosure. As shown in FIG. 1, the system includes a server 11, at least one delivery party (for example, smart phones 12 to 14) and a network 15.

The server 11 may be a physical server including an independent host or a virtual server borne by a host cluster. The server 11 may run a server-side program of an application to serve as a corresponding service end to implement relevant service functions of the application. For example, the server 11 may run a server-side program of a delivery service platform to serve as the service end of the delivery service platform.

The smart phones 12 to 14 represent one type of electronic devices usable by a user. Actually, the user may also use the following types of electronic devices: a tablet computer, a laptop computer, a Personal Digital Assistant (PDA), a wearable device (e.g. smart glasses, and smart watch and the like) and the like, which is not limited in one or more embodiments of the present disclosure. The electronic device may run a client-side program of an application to achieve relevant service functions of the application. For example, the smart phones 12 to 14 may run a deliveryman-side program of the delivery service platform to serve as the delivery party of the delivery service platform.

The network 15 for interactions between the smart phones 12 to 14 and the server 11 may include multiple types of wired or wireless networks. For example, the network 15 may include a Public Switched Telephone Network (PSTN) and an internet. The server 11 may establish a long connection with the smart phones 12 to 14 through the network 15, such that data transmission can be performed between the server 11 and the smart phones 12 to 14 through the long connection.

Figure 2:
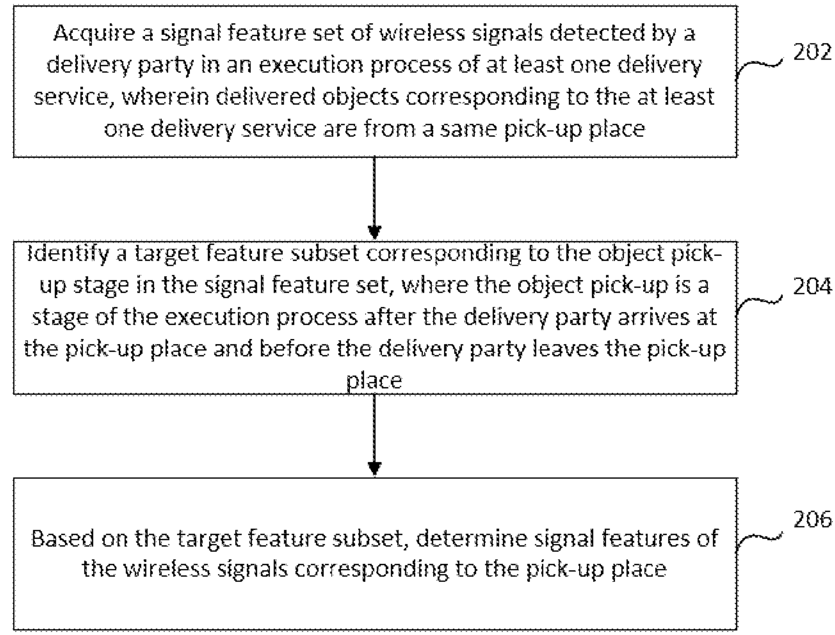
FIG. 2 is a flowchart illustrating a method for acquiring features of wireless signals according to an exemplary embodiment of the present disclosure.

FIG. 2 is a flowchart illustrating a method for acquiring features of wireless signals according to an exemplary embodiment of the present disclosure. As shown in FIG. 2, the method is applied to a service end and may include the following steps.

At step 202, a signal feature set of wireless signals detected by a delivery party in an execution process of at least one delivery service is acquired, where delivered objects corresponding to the at least one delivery service are from a same pick-up place.

In this embodiment, the user may place an order for any commodity on an electronic commerce platform. In some cases, the commodity ordered by the user is to be delivered from an entity shop or warehouse to a place designated by the user. Therefore, a delivery service platform (for example, the electronic commerce platform or a delivery platform in cooperation with it) needs to generate a corresponding delivery service for the delivered object, and distribute the delivery service to the delivery party (a client device used by a deliveryman). After accepting the delivery service, the deliveryman goes to a pick-up place of the delivered object (e.g. the above entity shop or warehouse) to pick up the delivery object, and delivers the delivered object to a place specified by the user after successfully pick it up.

For example, in a takeout scenario, a user places an order to an entity shop on a takeout platform by using a user client (i.e. delivery target), and the takeout platform generates a corresponding takeout order and then distributes the takeout order to a delivery party (a client device used by a deliveryman in this case). Then, the deliveryman goes to the entity shop (a pick-up place of the delivered object) to pick up the takeout and delivers it to a place specified by the user. For another example, in an express delivery scenario, for a delivered object stored in a warehouse, an express delivery platform generates a corresponding delivery order and distributes the delivery order to a delivery party (the client device of the express deliveryman in this case), and thus the express deliveryman goes to the warehouse (i.e. the pick-up place of the delivered object) to pick it up and delivers it to a place specified by a recipient (in this case, the client used by the recipient is the delivery target).

Thus, the execution process of the delivery service includes a stage of going to the pick-up place of the delivered objects, a stage of picking up the delivered objects after arriving at the pick-up place (i.e. object pick-up stage), and a stage of delivering the delivered objects after leaving the pick-up place. At the same time, there is a corresponding wireless signal in the pick-up place. For example, the pick-up place is configured with a WirelessAccessPoint (AP) and the delivery party is configured with a WiFi module, and thus the delivery party can detect a WiFi signal transmitted by the AP in the pick-up place within a range. Therefore, the delivery party can detect signal features of the wireless signals in a process of executing a delivery service. Due to limitation of the wireless signals in a signal range (not detected once beyond a specific range), for the stage of going to the pick-up place and the stage after leaving the pick-up place, the wireless signals detected by the delivery party are not the wireless signals corresponding to the pick-up place, but for the above object pick-up stage, the delivery party is in the pick-up place and thus can detect the wireless signals corresponding to the pick-up place. Therefore, the features of the wireless signals detected by the delivery party within the object pick-up stage can be used for determining the signal features of the wireless signals corresponding to the pick-up place.

Certainly, any other short-range communication technology can be adopted as long as it has the characteristics of range limitation. For example, Infrared Data Association (IrDA) infrared data transmission, ZigBee, Near Field Communication (NFC), Ultra WideBand (UWB), Digital Enhanced Cordless Telecommunications (DECT) and the like may be adopted.

It is noted that when the signal feature set is constructed, it is unnecessary to be restricted within only one delivery service, and multiple delivery services may be covered as long as the delivered objects corresponding to the delivery services are all from a same pick-up place. In this way, a data volume of the signal feature set can be increased and the accuracy rate of acquiring the signal features of the wireless signals of the pick-up place subsequently can be increased. Similarly, multiple delivery parties rather than one delivery party may be involved as long as the delivered objects corresponding to the delivery services executed by the multiple delivery parties are all from a same pick-up place. Thus, the signal feature set can cover multiple types of delivery parties (hardware performances of the delivery parties are different), so as to increase the accuracy rate of acquiring the signal features. For example, in a takeout scenario, a signal feature set may be constructed by selecting multiple takeout orders (may be accepted by different deliverymen) for a same entity shop. Similarly, in an express delivery scenario, a signal feature set may be constructed by selecting multiple express orders (may be accepted by different express deliverymen) for a same warehouse.

At step 204, a target feature subset corresponding to the object pick-up stage in the signal feature set is identified, where the object pick-up stage is a stage of the execution process after the delivery party arrives at the pick-up place and before the delivery party leaves the pick-up place.

In this embodiment, the signal feature set covers, in time sequence, the stage in which the deliveryman goes to the pick-up place (referred to going-to stage hereinafter), the stage in which the deliveryman picks up the delivered objects after arriving at the pick-up place (referred to as object pick-up stage hereinafter) and the stage in which the deliveryman delivers the delivered objects after leaving the pick-up place (referred to as object delivery stage hereinafter). In other words, the signal feature set includes the signal features of all wireless signals detected by the delivery party in the going-to stage, the object pick-up stage and the object delivery stage.

The delivery party may detect feature values of the wireless signals in a preset feature dimension based on a preset detection period. Since multiple wireless signals may be detected at the same time (there are multiple different wireless signals in the place), the signal features of the wireless signals acquired by detection may be one feature sequence, which includes the feature values of all wireless signals detected at the same time in the feature dimension. Correspondingly, since the signal feature set covers the execution process of the entire delivery service, the signal feature set may be divided into feature subsets respectively corresponding to the going-to stage, the object pick-up stage and the object delivery stage, and each of the feature subsets includes feature sequences of the wireless signals detected by the delivery party within the corresponding stage.

Furthermore, for the going-to stage and the object delivery stage, since the delivery party continuously moves within a large movement scope in the above two stages, the feature values of the wireless signals detected by the delivery party change frequently. For the object pick-up stage, since the delivery party is in the pick-up place without moving continuously and hence has a small movement scope, the feature values of the wireless signals detected by the delivery party are relatively stable. Therefore, compared with the going-to stage and the object delivery stage, the feature sequences detected in different detection periods in the object pick-up stage are most similar. Due to the characteristics, the target feature subset corresponding to the object pick-up stage in the signal feature set may be identified based on the similarity between each feature sequence included in each feature subset.

As an exemplary embodiment, the similarity between each feature sequence may be determined and based on the similarities, the feature sequences are distributed to acquire a distribution of the signal feature set. The rule for the distribution of the feature sequences is that: a distribution density of the feature sequences is positively correlated with the corresponding similarity. In other words, the higher the similarity between any two feature sequences is, the distribution of the two feature sequences appears to be denser. Then, based on the distribution of the signal feature set (i.e. the distribution of the feature sequences), a feature subset with the feature sequences having the highest density in the signal feature set is taken as the target feature subset.

For example, the similarity between each feature sequence may be measured by a distance. Specifically, when the distribution of the signal feature set is determined, a corresponding feature matrix may be constructed based on the feature values included in each feature sequence, and a distance between each feature matrix is calculated, if the calculated distance between two feature matrices is within a distance threshold, an association relationship between the corresponding two feature sequences is established. The distance between the feature matrices may be represented by Euclidean distance, Jacobi distance and cosine distance and the like, which is not limited in the present disclosure. Correspondingly, when the target feature subset in the signal feature set is determined, graph construction (taking the feature sequences as nodes) may be firstly performed based on the established association relationship to acquire a network graph and then a community of the network graph is determined, where the feature sequences included in the community form the target feature subset.

At step 206, based on the target feature subset, signal features of the wireless signals corresponding to the pick-up place are determined.

In this embodiment, after the target feature subset is determined, a target feature sequence may be selected from the feature sequences included in the target feature subset, and then based on the feature values of the wireless signals included in target feature sequence, the signal features of the wireless signals corresponding to the pick-up place are represented. The target feature sequence may be selected in combination with a centermost node. Specifically, the centermost node of the community of the above network graph is determined, and then N nodes are acquired by expanding outwardly based on a preset distance with the centermost node as center, where the feature sequence corresponding to the N nodes is the target feature sequence. Further, a mean feature value may be calculated based on the feature values recorded by the feature sequence corresponding to the N nodes, and the mean feature value is used to represent the signal features of the wireless signals corresponding to the pick-up place. Alternatively, a feature sequence with the highest frequency of appearance in the feature sequences corresponding to the N nodes may be selected, and then the feature values included in the selected feature sequence are used to represent the signal features of the wireless signals corresponding to the pick-up place.

It should be noted that the target feature sequence may be selected by another way, which is not limited in the present disclosure. For example, any preset number of feature sequences may be selected from the target feature subset as the target feature sequence. Alternatively, averaging, weighted averaging or median calculation or the like is performed on the feature values recorded by the feature sequences included in the target feature subset to acquire the target feature sequence.

In this embodiment, if the delivery party detects multiple different wireless signals, when each feature sequence is constructed, a mapping relationship between the signal identifier of each wireless signal detected by the delivery party and the corresponding feature value is recorded in the corresponding feature sequence. Based on the data format of the feature sequences, in order to represent the signal features of the wireless signals corresponding to the pick-up place, a target signal identifier of the wireless signals corresponding to the pick-up place may be firstly determined, and then, based on the mapping relationship recorded by the target feature sequence, a target feature value corresponding to the target signal identifier is determined. Thus, based on the target feature value, the signal features of the wireless signals corresponding to the pick-up place are represented. By the above representation manner, interference of the wireless signals of other places near the pick-up place can be avoided, so as to improve the accuracy rate of acquiring the signal features.

In the present embodiment, time information corresponding to the target feature sequence theoretically matches time information of the object pick-up stage, and thus, in order to further improve the accuracy rate of representing the signal features, the time information reported by the delivery party and corresponding to the object pick-up stage may be used as a check standard to check the target feature sequence in the time dimension. Specifically, the time information reported by the delivery party and corresponding to the object pick-up stage may be acquired such that, in response to that the detection period corresponding to the target feature sequence matches the time information, the signal features of the wireless signals corresponding to the pick-up place are represented based on the feature values of the wireless signals included in the target feature sequence.

For example, the time information reported by the delivery party and corresponding to the object pick-up stage may include a moment of arrival at the pick-up place and a moment of leaving the pick-up place which are respectively uploaded by the deliveryman by the delivery party. For example, in a takeout scenario, the deliveryman may manually click an arrive-at-shop trigger control and a leave-shop trigger control on a client of the deliveryman, where the arrive-at-shop trigger control is used to trigger the client of the deliveryman to report an arrive-at-shop event (recording a moment of arrival at shop), and the leave-shop trigger control is used to trigger the client of the deliveryman to report a leave-shop event (recording a moment for leaving shop). Since the moments that the deliveryman manually clicks the arrive-at-shop trigger control and the leave-shop trigger control may have a deviation from the moments of actual occurrence of the arrive-at-shop event and the leave-shop event (for example, advanced or delayed), a threshold may be set to reduce the influence of the above deviation. For example, continued from the above example in which N nodes are acquired, the above deviation relationship may be: the moment that the deliveryman clicks the arrive-at-shop trigger control<each moment in a period of time in which the deliveryman is actually in shop<the moment that the deliveryman clicks the leave-shop trigger control. For the above relationship, if the detection moments (acquired by the detection period) corresponding to the nodes exceeding the threshold (e.g. 90% or 80% or the like) in the N nodes are all located in the period of time of "the moment that the deliveryman clicks the arrive-at-shop trigger control to the moment that the deliveryman clicks the leave-shop trigger control", it is determined that checking on the target feature sequence is passed.

In this embodiment, the wireless signals include a WiFi signal. In this case, the feature dimension used by the delivery party to detect the wireless signals includes a WiFi fingerprint, and the WiFi fingerprint includes a multipath structure of the WiFi signal and/or a signal strength of the WiFi signal (RSS).

From the above embodiments, it can be seen that, on one hand, in the above process of acquiring features of the wireless signal, a deliveryman is not required to add extra operations when using the delivery party to make delivery, while the signal features of the detected wireless signals are uploaded by the delivery party. As a result, the normal delivery process of the deliveryman will not be affected. Thus, manual detection of the signal features can be avoided while normal execution of the delivery service is guaranteed. In this way, costs are reduced and the detection efficiency is improved. On the other hand, as long as there is any delivery service to be executed by the delivery party in the pick-up place, the feature acquisition solution of the present disclosure can be used to acquire the signal features of the wireless signals of the pick-up place, which means the feature acquisition solution of the present disclosure can cover all pick-up places with delivery services, thereby improving the coverage rate. Further, the signal features of the wireless signals of the pick-up place can be updated easily.

In the application scenarios involving delivery in the above embodiments, there is a requirement for acquiring an execution progress of a delivery service, so as to monitor the execution of the delivery service and ensure smooth progress of the delivery service as well as helping the user to know about the logistics information of the ordered objects. Specifically, in an execution process of the deliver party for a delivery service, there is a requirement for knowing whether the deliveryman arrives at the pick-up place and whether the deliveryman leaves the pick-up place subsequently. For example, for the above takeout scenario, it is required to know whether the deliveryman arrives at a shop and whether the deliveryman leaves the shop to start delivery subsequently. For the above express delivery scenario, it is required to know whether the express deliveryman arrive at a warehouse and whether the express deliveryman leaves the warehouse to start delivery subsequently. Further, based on the signal features of the wireless signals corresponding to the pick-up place and acquired based on the above embodiments, whether the user arrives at the pick-up place can be determined. For example, in addition to providing a takeout service, an entity shop may also provide a service of consumption in shop. The user may book the in-shop consumption and thus whether the user arrives at the shop can be determined based on the signal features of the wireless signals corresponding to the entity shop.

In conclusion, indoor positioning may be performed on the user needing to go to the pick-up place based on the signal features acquired based on the above embodiments, so as to determine whether the user arrives at the pick-up place and whether the user leaves the pick-up place subsequently. Descriptions will be made below in combination with FIG. 3.

Figure 3:
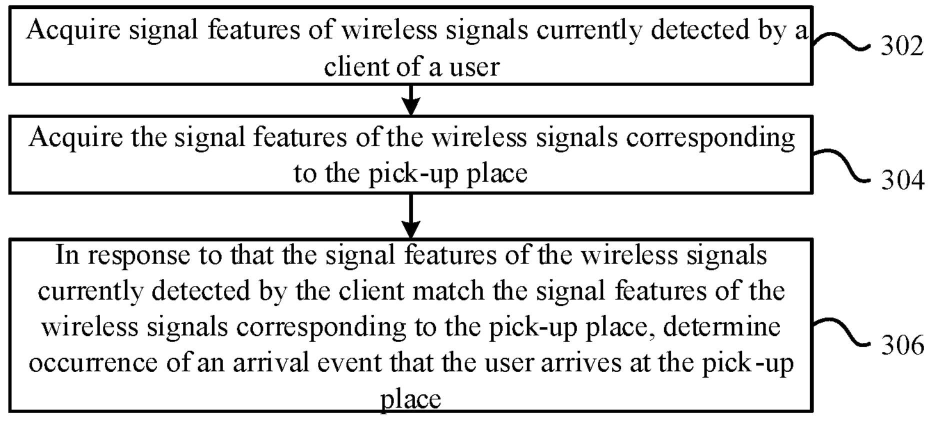
FIG. 3 is a flowchart illustrating an event determination method according to an exemplary embodiment of the present disclosure.

FIG. 3 is a flowchart illustrating an event determination method according to an exemplary embodiment of the present disclosure. As shown in FIG. 3, the method is applied to a service end and includes the following steps.

At step 302, signal features of wireless signals currently detected by a client of a user are acquired.

In this embodiment, the above user may be a takeout deliveryman, an express deliveryman and a customer going to an entity shop for consumption in shop and the like. The signal features of the wireless signals corresponding to the pick-up place and acquired based on the above embodiments are compared with the signal features of the wireless signals currently detected by the user to determine whether the user arrives at the above pick-up place.

At step 304, the signal features of the wireless signals corresponding to the pick-up place are acquired.

In this embodiment, after the signal features of the wireless signals corresponding to the pick-up place are acquired based on the above embodiments, a fingerprint library may be maintained as a determination standard by using the signal features, that is, the fingerprint liberty records the signal features of the wireless signals corresponding to each pick-up place. In this case, after the signal features of the wireless signals currently detected by the user are acquired, matching operation may be performed in the fingerprint library. If the matching hits a pick-up place, it is determined that the user arrives at the pick-up place. The matching process is similar to the above embodiments, for example, a similarity between the signal features of the wireless signals currently detected by the user and the signal features recorded in the fingerprint library may be calculated and then compared with a preset threshold. If the similarity exceeds the preset threshold, it is determined that both of them are matched.

At step 306, in response to that the signal features of the wireless signals currently detected by the client of the user match the signal features of the wireless signals corresponding to the pick-up place, occurrence of an arrival event that the user arrives at the pick-up place is determined.

In this embodiment, after the occurrence of the arrival event is determined, whether the user leaves the pick-up place may be determined further based on the signal features of the wireless signals corresponding to the pick-up place. Specifically, if the signal features of the wireless signals currently detected by the client of the user do not match the signal features of the wireless signals corresponding to the pick-up place, it is determined that the leave event that the user leaves the pick-up place occurs.

Corresponding to the above embodiments at the service end side, the present disclosure further provides an embodiment at delivery party side. The descriptions involved in the embodiments of the service end side are also applicable to the embodiments of the delivery party side and thus will not be repeated herein.

Figure 4:
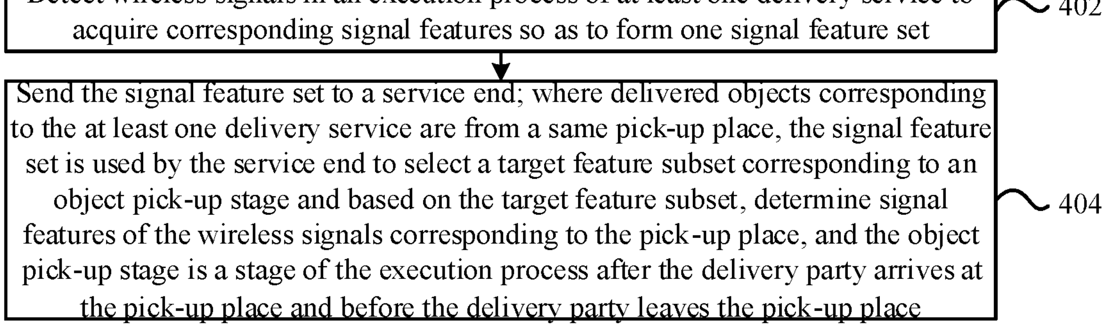
FIG. 4 is a flowchart illustrating a method for uploading features of wireless signals according to an exemplary embodiment of the present disclosure.

FIG. 4 is a flowchart illustrating a method for uploading features of wireless signals according to an exemplary embodiment of the present disclosure. As shown in FIG. 4, the method is applied to a delivery party and includes the following steps.

At step 402, wireless signals are detected in an execution process of at least one delivery service to acquire corresponding signal features so as to form one signal feature set.

At step 404, the signal feature set is sent to a service end; where delivered objects corresponding to the at least one delivery service are from a same pick-up place, the signal feature set is used by the service end to select a target feature subset corresponding to an object pick-up stage and based on the target feature subset, determine signal features of the wireless signals corresponding to the pick-up place, and the object pick-up stage is a stage of the execution process after the delivery party arrives at the pick-up place and before the delivery party leaves the pick-up place.

In order to help understanding, the technical solutions of the present disclosure will be detailed in combination with application scenarios.

Figure 5:
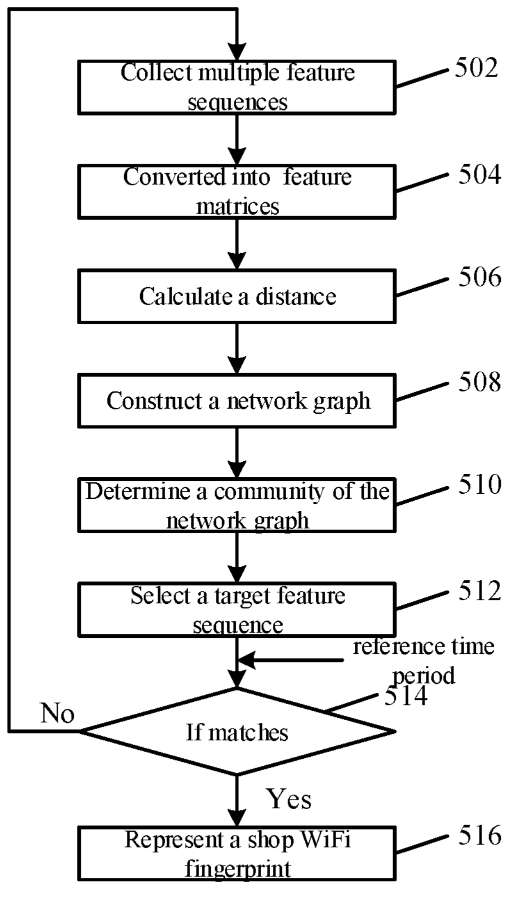
FIG. 5 is a flowchart illustrating a method of mounting a shop WiFi fingerprint according to an exemplary embodiment of the present disclosure.

FIG. 5 is a flowchart illustrating a method of mounting a shop WiFi fingerprint according to an exemplary embodiment of the present disclosure. As shown in FIG. 5, the method is applied to a service end and includes the following steps.

At step 502, multiple feature sequences collected by the deliveryman in a process of delivering a takeout order are acquired.

In this embodiment, with a takeout scenario as an example, for each of multiple takeout orders of an entity shop to be detected, the feature sequences of the WiFi signals collected by a client of a corresponding deliveryman accepting the takeout order during a delivery process are acquired. For example, the deliveryman client may collect signal strength of the detected WiFi signals every 10 seconds to generate a feature sequence. The data format of the feature sequence is WiFi_id:rssi, where WiFi_id is a signal identifier of the WiFi signals, for example, an mac address of the hardware device transmitting the WiFi signals is used as a signal identifier; and rssi is the signal strength.

At step 504, the feature sequences are converted into corresponding feature matrices.

At step 506, a distance between each feature matrix is calculated.

At step 508, based on the calculated distances, an association relationship between the feature sequences is established and based on the association relationship, a network graph is constructed.

At step 510, a community of the network graph is determined.

At step 512, a target feature sequence is selected.

For example, the feature sequence A is WiFi_1:80, WiFi_2:90, WiFi_3:80, WiFi_4:60; the feature sequence B is WiFi_1:70, WiFi_2:60, WiFi_3:30, WiFi_4:40. Thus, the feature matrix a of the feature sequence A may be constructed: [−80,90,80,60], and the feature matrix b of the feature sequence B may be constructed: [−70,60,30,40], and thus, the distance between the feature matrix a and the feature matrix b may be calculated: [−80,90, 80,60]-[−70, 60,30,40].

Whether there is an association relationship between two feature sequences may be determined by setting a distance threshold. For any two feature sequences, if the distance between the corresponding feature matrices is within the distance threshold, an association relationship is established between the two feature sequences. When graph construction is performed based on the association relationship, the nodes of the network graph are used to represent the feature sequences and a connection side between the nodes of the network graph represents the association relationship (if there is an association relationship between two feature sequences, the corresponding nodes are connected by using a connection side). Of course, the specific value of the distance threshold may be set flexibly based on actual situations, which is not limited herein.

Figure 6:
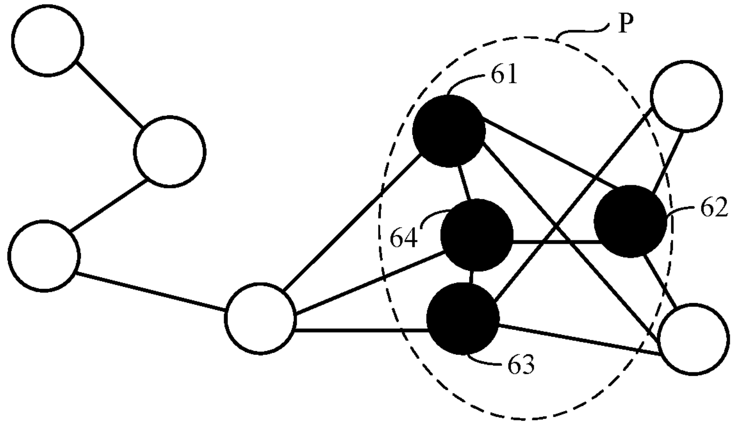
FIG. 6 is a schematic diagram illustrating a network graph constructed based on feature sequence according to an exemplary embodiment of the present disclosure.

If a total of 10 feature sequences are acquired, the network graph shown in FIG. 6 is acquired by the above graph construction manner. As shown in FIG. 6, each node represents one feature sequence, and each node is connected to its neighboring node, where the number of connection sides of each node is less than or equal to k (k=4).

Furthermore, the network graph may be decomposed and iterated to obtain a community of the network graph. There may be some closely-connected regions in information network, social network and biological network and the like. These regions (node set) usually correspond to some function called community. Detecting the community in the network is equivalent to grouping the nodes. The Modularity is a common standard for measuring node grouping quality. The higher modularity means the community detected is more in compliance with the feature of "inner tight and outer loose" and the grouping quality is better. Based on the concept of the modularity, the community can be detected by using modularity maximization. The method aims to seek a group with the largest modularity from all possible groups.

The community of the network graph may also be determined by a clustering algorithm in k-Core algorithm and machine learning algorithm.

k-Core algorithm is a subgraph mining algorithm used to seek a set of nodes conforming to a specified core degree in a graph, namely, it is required that each node is at least associated with other k nodes in the set. With the graph G and the core degree k as an example, the k-Core algorithm includes the following steps.

At step 1, all vertices with the degree less thank in the graph G are removed to acquire a subgraph G'.

At step 2, all vertices with the degree less than k in the subgraph G' are removed to acquire a new subgraph G", where the subgraph G" is a result subgraph finally acquired based on the k-Core.

For the clustering algorithm, K-means algorithm, DBSCAN algorithm or Gaussian mixture clustering or the like may be used, which is not limited herein.

As shown in FIG. 6, the community P may be acquired in the above manner, where the community P includes nodes 61 to 64. Furthermore, a centermost node of the community P may be determined (a node with the highest centrality, where the measure of the centrality is degree, namely, the number of the connection sides), and then, with the centermost node as center, N nodes are acquired by expanding outwardly based on a preset distance, where the feature sequence corresponding to the N nodes is the target feature sequence.

At step 514, if a detection moment corresponding to the target feature sequence matches a reference time period, step 516 is performed and otherwise, step 502 is repeated.

In this embodiment, the deliveryman may manually click an arrive-at-shop trigger control and a leave-shop trigger control on a client of the deliveryman, where the arrive-at-shop trigger control is used to trigger the client of the deliveryman to report an arrive-at-shop event (recording a moment of arrival at shop), and the leave-shop trigger control is used to trigger the client of the deliveryman to report a leave-shop event (recording a moment for leaving shop). Since the moments that the deliveryman manually clicks the arrive-at-shop trigger control and the leave-shop trigger control may have a deviation from the moments of actual occurrence of the arrive-at-shop event and the leave-shop event (for example, advanced or delayed), a threshold may be set to reduce the influence of the above deviation.

For example, continued from the above example in which N nodes are acquired, the reference time period is a period from a moment that the deliveryman clicks the arrive-at-shop trigger control to a moment that the deliveryman clicks the leave-shop trigger control. In this case, the above deviation relationship may be: the moment that the deliveryman clicks the arrive-at-shop trigger control<each moment in a period of time in which the deliveryman is actually in shop<the moment that the deliveryman clicks the leave-shop trigger control. For the above relationship, if the detection moments (acquired by the detection period) corresponding to the nodes exceeding the threshold (e.g. 90% or 80% or the like) in the N nodes are all located in the above reference time period, it is determined that checking on the target feature sequence is passed.

At step 516, a shop WiFi fingerprint is represented.

Continued from the above example, an average feature value may be calculated for the feature values recorded by the feature sequence corresponding to the N nodes, and then, based on the average feature value, the shop WiFi fingerprint is represented. Alternatively, a target sequence with the highest frequency of appearance may be selected from the feature sequences corresponding to the N nodes and then, the shop WiFi fingering is represented by using the feature values included in the target sequence.

Based on the data format of the feature sequence, in order to represent the shop WiFi fingerprint, a target signal identifier of the WiFi signals of an entity shop may be firstly determined, and then a target feature value (signal strength) corresponding to the target signal identifier in the target feature sequence is determined, and then based on the target feature value, the shop WiFi fingerprint is represented. For example, the target feature sequence is WiFi_1:−80, WiFi_2:90, WiFi_3:−80, WiFi_4:−60; the WiFi_id of the WiFi signal of the entity shop is WiFi_3, and thus, the signal strength −80 recorded in the WiFi_3:80 is used to represent the shop WiFi fingerprint.

Figure 7:
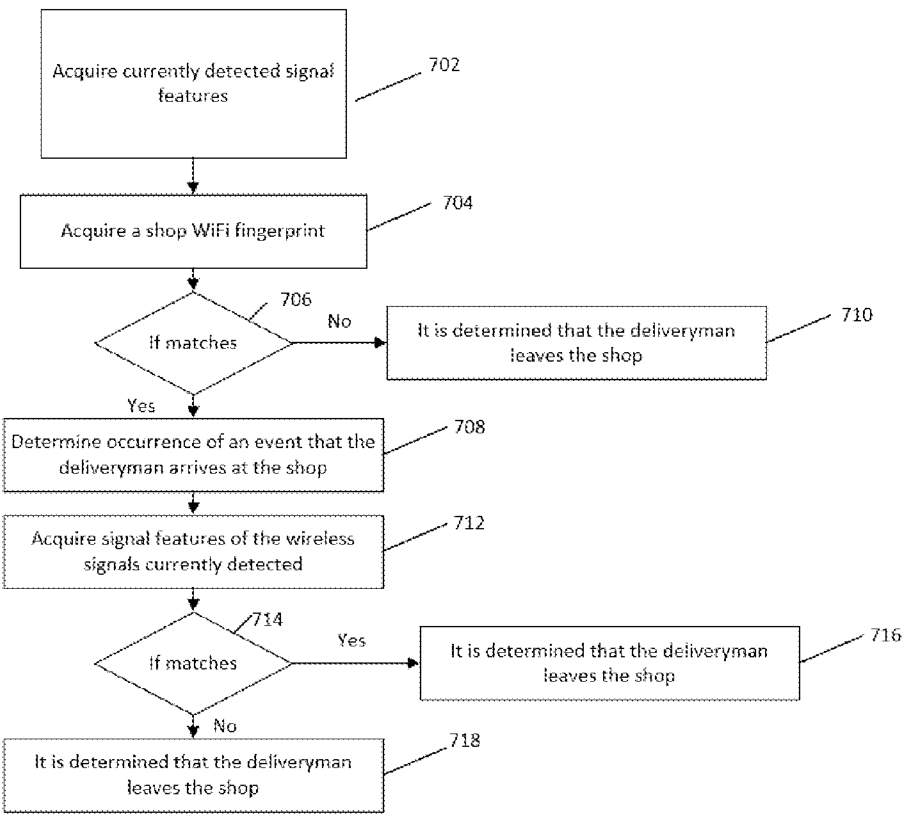
FIG. 7 is a flowchart illustrating a method of determining an arrive-at-shop event according to an exemplary embodiment of the present disclosure.

FIG. 7 is a flowchart illustrating a method of determining an arrive-at-shop event according to an exemplary embodiment of the present disclosure. As shown in FIG. 7, the method is applied to a service end and includes the following steps.

At step 702, signal features of wireless signals currently detected by a client of a deliveryman are acquired.

At step 704, a shop WiFi fingerprint is acquired.

At step 706, if the signal features match the shop WiFi fingerprint, step 708 is performed and otherwise, step 710 is performed.

In this embodiment, the shop WiFi fingerprint acquired based on the above embodiment may be compared with the signal features (e.g. represented by signal strength) of the wireless signals currently detected by the client of the deliveryman so as to determine whether the deliveryman arrives at the entity shop.

At step 708, occurrence of an event that the deliveryman arrives at the shop is determined.

At step 710, it is determined that the deliveryman has not arrived at the shop.

In this embodiment, after the shop WiFi fingerprint of each entity shop is acquired based on the above embodiment, a fingerprint library may be maintained as a determination standard by using the shop WiFi fingerprint of each entity shop, that is, the fingerprint library records the signal features of the WiFi signals of each entity shop. In this case, after the signal strength of the WiFi signals currently detected by the client of the deliveryman is acquired, matching operation may be performed in the fingerprint library. If the matching hits an entity shop, it is determined that the deliveryman arrives at the entity shop. The matching process is similar to the above embodiments, for example, a similarity between the signal strength of the WiFi signals currently detected by the client of the deliveryman and the signal strength recorded in the fingerprint library may be calculated and then compared with a preset threshold. If the similarity exceeds the preset threshold, it is determined that both of them are matched.

At step 712, the signal features of the wireless signals currently detected by the client of the deliveryman are acquired.

At step 714, when the signal features match the shop WiFi fingerprint, step 716 is performed and otherwise, step 718 is performed.

At step 716, it is determined that the deliveryman does not leave the shop.

At step 718, it is determined that the deliveryman leaves the shop.

In this embodiment, after it is determined that the deliveryman arrives at the shop (there may be cases that it takes some time to pick up the takeout or wait for preparation of the takeout), it may be further determined based on the shop WiFi fingerprint whether the deliveryman leaves the shop. Specifically, if the signal strength of the WiFi signals currently detected by the client of the deliveryman does not match the shop WiFi fingerprint of the corresponding entity shop, it is determined that the deliveryman leaves the shop.

Figure 8:
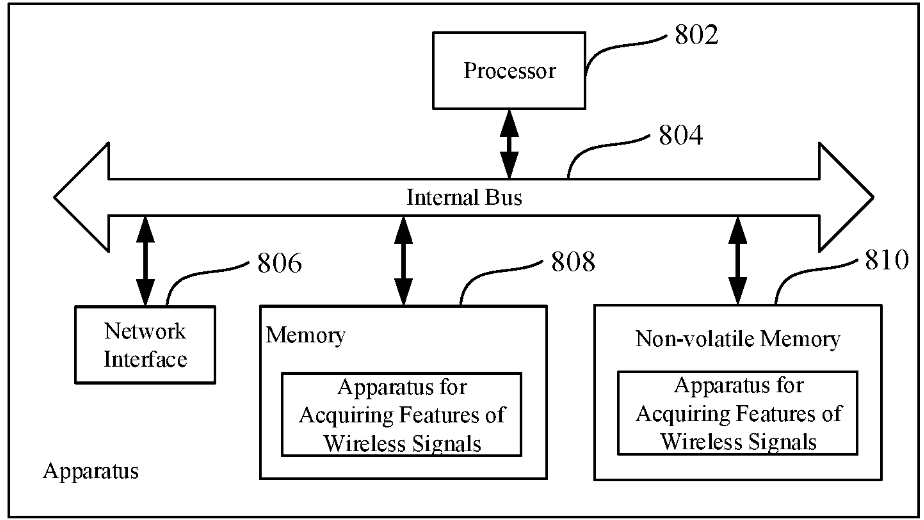
FIG. 8 is a structural schematic diagram illustrating an electronic device according to an exemplary embodiment of the present disclosure.

FIG. 8 is a structural schematic diagram illustrating an electronic device according to an exemplary embodiment of the present disclosure. As shown in FIG. 8, from the hardware level, the device may include a processor 802, an internal bus 804, a network interface 806, a memory 808 and a non-volatile memory 810 and may also include the hardware required by other services. The processor 802 reads the corresponding computer programs from the non-volatile memory 810 into the memory 808 for running, so as to form an apparatus for acquiring features of the wireless signals logically. Of course, in addition to the software implementation, one or more embodiments of the present disclosure do not preclude other implementation manners, for example, logic device or combination of software and hardware and the like. In other words, the execution subject of the following flows is not limited to each logic unit and may also be hardware or logic device.

Figure 9:
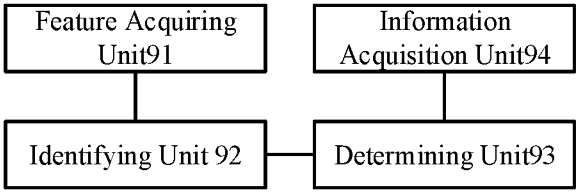
FIG. 9 is a block diagram illustrating an apparatus for acquiring features of wireless signals according to an exemplary embodiment of the present disclosure.

As shown in FIG. 9, in the software implementation, the apparatus for acquiring the features of the wireless signals is applied to a service end and may include:

a feature acquiring unit 91, configured to acquire a signal feature set of wireless signals detected by a delivery party in an execution process of at least one delivery service, where delivered objects corresponding to the at least one delivery service are from a same pick-up place;

an identifying unit 92, configured to identify a target feature subset corresponding to an object pick-up stage in the signal feature set, where the object pick-up stage is a stage of the execution process after the delivery party arrives at the pick-up place and before the delivery party leaves the pick-up place;

a determining unit 93, configured to, based on the target feature subset, determine signal features of the wireless signals corresponding to the pick-up place.

Optionally, the signal feature set includes a plurality of feature sequences which are acquired by detecting a feature value of each wireless signal in a preset feature dimension based on a preset detection period; the identifying unit 92 is specifically configured to:

determine a similarity between the each feature sequence in the signal feature set, and based on the similarities, determining a distribution of the feature sequences; wherein a distribution density of the feature sequences is positively correlated with a corresponding similarity;

determine a feature subset with the feature sequences of which the distribution density is highest in the signal feature set as the target feature subset.

Optionally, the identifying unit 92 is further configured to: based on the feature values included in each feature sequence, form a corresponding feature matrix, and calculate a distance between each feature matrix to establish an association relationship for the corresponding feature sequences, the distance between the feature matrices of the corresponding feature sequences being within a distance threshold;

based on the established association relationship, perform graph construction to acquire a network graph and determine a community of the network graph, where the feature sequences included in the community form the target feature subset.

Optionally, the signal feature set includes a plurality of feature sequences which are acquired by the delivery party by detecting a feature value of each wireless signal in a preset feature dimension based on a preset detection period; the determining unit 93 is specifically configured to:

select a target feature sequence from the feature sequences included in the target feature subset;

based on the feature values of the wireless signals included in the target feature sequence, represent the signal features of the wireless signals corresponding to the pick-up place.

Optionally, the feature sequences record a mapping relationship between a signal identifier of each detected wireless signal and a corresponding feature value; the determining unit 93 is further configured to:

determine a target signal identifier of the wireless signals corresponding to the pick-up place;

based on the mapping relationship recorded in the target feature sequence, determine a target feature value corresponding to the target signal identifier;

based on the target feature value, represent the signal features of the wireless signals corresponding to the pick-up place.

Optionally, the apparatus further includes:

an information acquisition unit 94, configured to acquire time information corresponding to the object pick-up stage and reported by the delivery party;

the determining unit 93 is further configured to: in response to that the detection period corresponding to the target feature sequence matches the time information, based on the feature values of the wireless signals included in the target feature sequence, represent the signal features of the wireless signals corresponding to the pick-up place.

Optionally, the wireless signals include a WiFi signal, and the feature dimension in which the delivery party detects the wireless signals includes a WiFi fingerprint, and the WiFi fingerprint includes a multipath structure of the WiFi signal and/or a signal strength of the WiFi signal.

Figure 10:
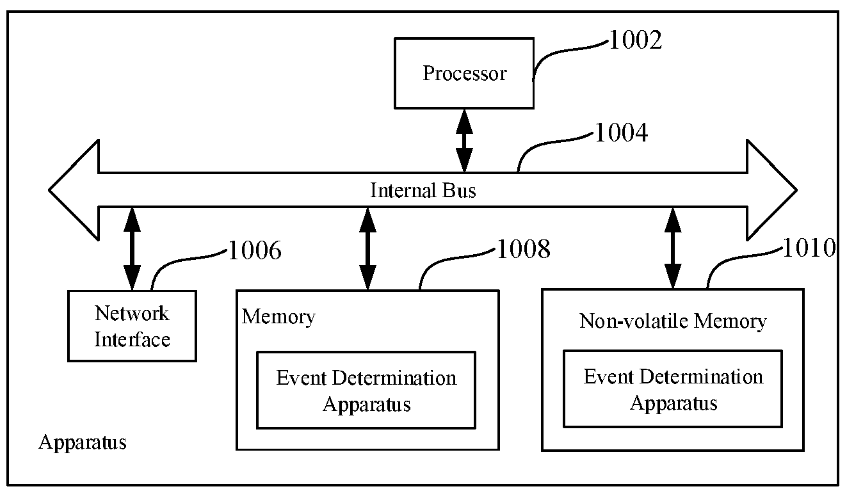
FIG. 10 is a structural schematic diagram illustrating another electronic device according to an exemplary embodiment of the present disclosure.

FIG. 10 is a structural schematic diagram illustrating an electronic device according to an exemplary embodiment of the present disclosure. As shown in FIG. 10, from the hardware level, the device may include a processor 1002, an internal bus 1004, a network interface 1006, a memory 1008 and a non-volatile memory 1010 and may also include the hardware required by other services. The processor 1002 reads the corresponding computer programs from the non-volatile memory 1010 into the memory 1008 for running, so as to form an event determination apparatus logically. Of course, in addition to the software implementation, one or more embodiments of the present disclosure do not preclude other implementation manners, for example, logic device or combination of software and hardware and the like. In other words, the execution subject of the following flows is not limited to each logic unit and may also be hardware or logic device.

Figure 11:
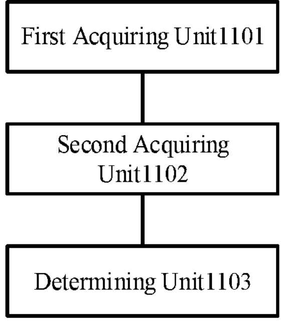
FIG. 11 is a block diagram illustrating an event determination apparatus according to an exemplary embodiment of the present disclosure.

As shown in FIG. 11, in the software implementation, the event determination apparatus may include:

a first acquiring unit 1101, configured to acquire signal features of wireless signals currently detected by a client of a user;

a second acquiring unit 1102, configured to acquire the signal features of the wireless signals corresponding to the pick-up place by the method of any one item of the first aspect;

a determining unit 1103, configured to, in response to that the signal features of the wireless signals currently detected by the client match the signal features of the wireless signal corresponding to the pick-up place, determine occurrence of an arrival event that the user arrives at the pick-up place.

Optionally, the determining unit 1103 is further configured to:

after the occurrence of the arrival event is determined, in response to that the signal features of the wireless signals currently detected by the client do not match the signal features of the wireless signal corresponding to the pick-up place, determine occurrence of an leave event that the user leaves the pick-up place.

Figure 12:
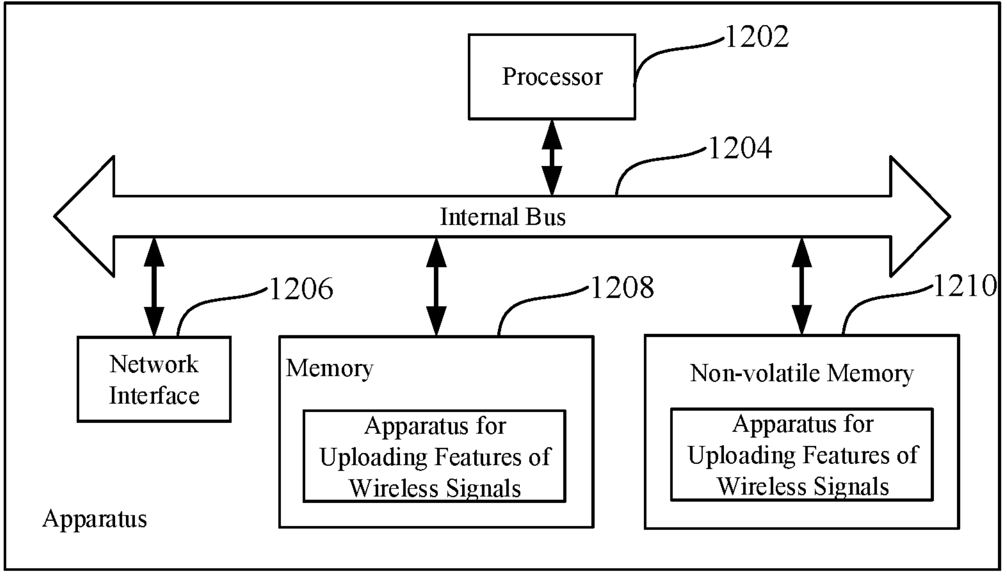
FIG. 12 is a structural schematic diagram illustrating another electronic device according to an exemplary embodiment of the present disclosure.

FIG. 12 is a structural schematic diagram illustrating an electronic device according to an exemplary embodiment of the present disclosure. As shown in FIG. 12, from the hardware level, the device may include a processor 1202, an internal bus 1204, a network interface 1206, a memory 1208 and a non-volatile memory 1210 and may also include the hardware required by other services. The processor 1202 reads the corresponding computer programs from the non-volatile memory 1210 into the memory 1208 for running, so as to form a feature uploading apparatus of wireless signals logically. Of course, in addition to the software implementation, one or more embodiments of the present disclosure do not preclude other implementation manners, for example, logic device or combination of software and hardware and the like. In other words, the execution subject of the following flows is not limited to each logic unit and may also be hardware or logic device.

Figure 13:
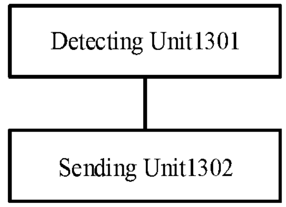
FIG. 13 is a block diagram illustrating an apparatus for uploading features of wireless signals according to an exemplary embodiment of the present disclosure.

As shown in FIG. 13, in the software implementation, the feature uploading apparatus of the wireless signals is applied to a delivery party and may include:

a detecting unit 1301, configured to detect wireless signals in an execution process of at least one delivery service to acquire corresponding signal features so as to form one signal feature set;

a sending unit 1302, configured to send the signal feature set to a service end; wherein delivered objects corresponding to the at least one delivery service are from a same pick-up place, the signal feature set is used by the service end to select a target feature subset corresponding to an object pick-up stage and based on the target feature subset, determine signal features of the wireless signals corresponding to the pick-up place, and the object pick-up stage is a stage of the execution process after the delivery party arrives at the pick-up place and before the delivery party leaves the pick-up place.

The systems, devices, modules or units described in the above embodiments may be implemented by computer chips or entities, or by products with certain functions. A typical implementation device is a computer, and the computer, in particular form, may be a personal computer, a laptop computer, a cellular phone, a camera phone, a smart phone, a personal digital assistant, a media player, navigation equipment, an electronic mail transceiver, a tablet computer, wearable device, or combinations of any several devices of these devices.

In one typical configuration, the computer includes one or more central processing units (CPU), an input/output interface, a network interface and a memory.

The memory may include a non-permanent memory in the computer readable storage medium, a random access memory (RAM) and/or non-volatile memory and the like, for example, Read Only Memory (ROM) or flash memory. The memory is an example of the computer readable medium.

The computer readable storage medium includes permanent, non-permanent, removable and non-removable media, which can realize information storage by any method or technology. The information may be computer readable instructions, data structures, program modules and other data. The examples of the computer storage medium include but not limited to: phase change random access memory (PRAM), a Static Random Access Memory (SRAM), a Dynamic Random Access Memory (DRAM), and other types of RAMs, Read-Only Memory (ROM), an Electrically-Erasable Programmable Read-Only Memory (EEPROM), a Flash Memory, or other memory technology, CD-ROM, digital versatile disc (DVD) or other optical storage, cassette type magnetic tape, magnetic disk storage, quantum storage, graphene-based storage medium, or other magnetic storage device or other non-transmission medium for storing information accessible by computing devices. As defined in the present disclosure, the computer readable medium does not include transitory computer readable media such as modulated data signals or carriers.

It should be noted that the term "including", "containing" or any variation thereof is intended to encompass non-exclusive inclusion, so that a process, method, object or device including a series of elements includes not only those elements but also other elements not listed explicitly or those elements inherent to such a process, method, object or device. Without more limitations, an element defined by the statement "including a . . . " shall not be precluded to include additional same elements present in a process, method, object or device including the elements.

Specific embodiments of the present disclosure are described above. Other embodiments not described herein still fall within the scope of the appended claims. In some cases, the actions or steps recorded in the claims may be performed in a sequence different from the embodiments to achieve a desired result. In addition, processes shown in drawings do not necessarily require a particular sequence or a continuous sequence to achieve the desired result. In some embodiments, a multi-task processing and parallel processing are possible or may also be advantageous.

The terms used in one or more embodiments of the present disclosure are for the purpose of describing a particular embodiment only, and are not intended to be limiting of the present disclosure. The singular forms such as "a", 'said", and "the" used in the present disclosure and the appended claims are also intended to include multiple, unless the context clearly indicates otherwise. It is also to be understood that the term "and/or" as used herein refers to and includes any or all possible combinations of one or more associated listed items.

It is to be understood that, although the terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the term "if" as used herein may be interpreted as "when" or "upon" or "in response to determining".

The foregoing descriptions are only preferred embodiments of one or more embodiments of the present disclosure but not intended to limit one or more embodiments of the present disclosure. Any changes, equivalent replacements and improvements and the like made within the spirit and principle of one or more embodiments of the present disclosure shall fall within the scope of protection of one or more embodiments of the present disclosure.

What is claimed is:

1. A method for acquiring features of wireless signals, applied to a service end, and comprising:

acquiring a signal feature set of wireless signals detected by a delivery party in an execution process of at least one delivery service, wherein delivered objects corresponding to the at least one delivery service are from a same pick-up place;

identifying a target feature subset corresponding to an object pick-up stage in the signal feature set, wherein the object pick-up stage is a stage of the execution process after the delivery party arrives at the pick-up place and before the delivery party leaves the pick-up place;

based on the target feature subset, determining signal features of wireless signals corresponding to the pick-up place;

wherein the signal feature set comprises a plurality of feature sequences which are acquired by detecting a feature value of each wireless signal in a preset feature dimension based on a preset detection period;

identifying the target feature subset corresponding to the object pick-up stage in the signal feature set comprises:

determining a similarity between each feature sequence in the signal feature set, and based on the similarities, determining a distribution of the feature sequences; wherein a distribution density of the feature sequences is positively correlated with a corresponding similarity;

determining a feature subset with the feature sequences of which the distribution density is highest in the signal feature set as the target feature subset.

2. The method of claim 1, wherein, determining the similarity between each feature sequence in the signal feature set, and based on the similarities, determining the distribution of the feature sequences comprise:

based on the feature values comprised in each feature sequence, forming a corresponding feature matrix, and calculating a distance between each feature matrix to establish an association relationship for the corresponding feature sequences, the distance between the feature matrices of the corresponding feature sequences being within a distance threshold;

determining the feature subset with the feature sequences of which the distribution density is highest in the signal feature set as the target feature subset comprises:

based on the established association relationship, performing graph construction to acquire a network graph, and determining a community of the network graph, wherein the feature sequences comprised in the community form the target feature subset.

3. The method of claim 1, wherein the signal feature set comprises a plurality of feature sequences which are acquired by the delivery party by detecting a feature value of each wireless signal in a preset feature dimension based on a preset detection period;

based on the target feature subset, determining the signal features of the wireless signals corresponding to the pick-up place comprises:

selecting a target feature sequence from the feature sequences comprised in the target feature subset;

based on the feature values of the wireless signals comprised in the target feature sequence, representing the signal features of the wireless signals corresponding to the pick-up place.

4. The method of claim 3, wherein the feature sequences record a mapping relationship between a signal identifier of each detected wireless signal and a corresponding feature value;

based on the feature values of the wireless signals comprised in the target feature sequence, representing the signal features of the wireless signals corresponding to the pick-up place comprises:

determining a target signal identifier of the wireless signals corresponding to the pick-up place;

based on the mapping relationship recorded in the target feature sequence, determining a target feature value corresponding to the target signal identifier;

based on the target feature value, representing the signal features of the wireless signals corresponding to the pick-up place.

5. The method of claim 3, further comprising: acquiring time information corresponding to the object pick-up stage and reported by the delivery party;

based on the feature values of the wireless signals comprised in the target feature sequence, representing the signal features of the wireless signals corresponding to the pick-up place comprises: in response to that the detection period corresponding to the target feature sequence matches the time information, based on the feature values of the wireless signals comprised in the target feature sequence, representing the signal features of the wireless signals corresponding to the pick-up place.

6. The method of claim 1, wherein the wireless signals comprise a WiFi signal, and a feature dimension in which the delivery party detects the wireless signals comprises a WiFi fingerprint, and the WiFi fingerprint comprises a multipath structure of the WiFi signal and/or a signal strength of the WiFi signal.

7. An event determination method, comprising:

acquiring signal features of wireless signals currently detected by a client of a user;

acquiring the signal features of the wireless signals corresponding to the pick-up place by the method of claim 1;

in response to that the signal features of the wireless signals currently detected by the client match the signal features of the wireless signals corresponding to the pick-up place, determining occurrence of an arrival event that the user arrives at the pick-up place.

8. The method of claim 7, further comprising:

after the occurrence of the arrival event is determined, in response to that the signal features of the wireless signals currently detected by the client do not match the signal features of the wireless signals corresponding to the pick-up place, determining occurrence of an leave event that the user leaves the pick-up place.

9. A non-transitory computer readable storage medium, storing computer instructions, wherein the computer instructions are executed by a processor to perform the method of claim 1.

10. A method for uploading features of wireless signals, applied to a delivery party and comprising:

detecting wireless signals in an execution process of at least one delivery service to acquire corresponding signal features so as to form one signal feature set;

sending the signal feature set to a service end;

wherein delivered objects corresponding to the at least one delivery service are from a same pick-up place, the signal feature set is used by the service end to select a target feature subset corresponding to an object pick-up stage and based on the target feature subset, determine signal features of wireless signals corresponding to the pick-up place, and the object pick-up stage is a stage of the execution process after the delivery party arrives at the pick-up place and before the delivery party leaves the pick-up place, and the signal feature set comprises a plurality of feature sequences which are acquired by the service end detecting a feature value of each wireless signal in a preset feature dimension based on a preset detection period, and the service end selecting the target feature subset corresponding to the object pick-up stage comprises: determining a similarity between each feature sequence in the signal feature set, and based on the similarities, determining a distribution of the feature sequences; wherein a distribution density of the feature sequences is positively correlated with a corresponding similarity; determining a feature subset with the feature sequences of which the distribution density is highest in the signal feature set as the target feature subset.

11. An electronic device, comprising:

a processor;

a memory for storing processor executable instructions;

wherein the processor, when running the executable instructions, is caused to:

acquire a signal feature set of wireless signals detected by a delivery party in an execution process of at least one delivery service, wherein delivered objects corresponding to the at least one delivery service are from a same pick-up place;

identify a target feature subset corresponding to an object pick-up stage in the signal feature set, wherein the object pick-up stage is a stage of the execution process after the delivery party arrives at the pick-up place and before the delivery party leaves the pick-up place;

based on the target feature subset, determine signal features of wireless signals corresponding to the pick-up place;

wherein the signal feature set comprises a plurality of feature sequences which are acquired by detecting a feature value of each wireless signal in a preset feature dimension based on a preset detection period;

identifying the target feature subset corresponding to the object pick-up stage in the signal feature set comprises:

determining a similarity between each feature sequence in the signal feature set, and based on the similarities, determining a distribution of the feature sequences; wherein a distribution density of the feature sequences is positively correlated with a corresponding similarity;

determining a feature subset with the feature sequences of which the distribution density is highest in the signal feature set as the target feature subset.

12. The electronic device of claim 11, wherein, when determining the similarity between each feature sequence in the signal feature set, and based on the similarities, determining the distribution of the feature sequences, the processor is caused to:

based on the feature values comprised in each feature sequence, form a corresponding feature matrix, and calculate a distance between each feature matrix to establish an association relationship for the corresponding feature sequences, the distance between the feature matrices of the corresponding feature sequences being within a distance threshold;

when determining the feature subset with the feature sequences of which the distribution density is highest in the signal feature set as the target feature subset, the processor is caused to:

based on the established association relationship, perform graph construction to acquire a network graph, and determine a community of the network graph, wherein the feature sequences comprised in the community form the target feature subset.

13. The electronic device of claim 11, wherein the signal feature set comprises a plurality of feature sequences which are acquired by the delivery party by detecting a feature value of each wireless signal in a preset feature dimension based on a preset detection period;

when based on the target feature subset, determining the signal features of the wireless signals corresponding to the pick-up place, the processor is caused to:

select a target feature sequence from the feature sequences comprised in the target feature subset;

based on the feature values of the wireless signals comprised in the target feature sequence, represent the signal features of the wireless signals corresponding to the pick-up place.

14. The electronic device of claim 13, wherein the feature sequences record a mapping relationship between a signal identifier of each detected wireless signal and a corresponding feature value;

when based on the feature values of the wireless signals comprised in the target feature sequence, representing the signal features of the wireless signals corresponding to the pick-up place, the processor is caused to:

determine a target signal identifier of the wireless signals corresponding to the pick-up place;

based on the mapping relationship recorded in the target feature sequence, determine a target feature value corresponding to the target signal identifier;

based on the target feature value, represent the signal features of the wireless signals corresponding to the pick-up place.

15. The electronic device of claim 13, the processor is further caused to: acquire time information corresponding to the object pick-up stage and reported by the delivery party;

when based on the feature values of the wireless signals comprised in the target feature sequence, representing the signal features of the wireless signals corresponding to the pick-up place, the processor is caused to: in response to that the detection period corresponding to the target feature sequence matches the time information, based on the feature values of the wireless signals comprised in the target feature sequence, represent the signal features of the wireless signals corresponding to the pick-up place.

16. The electronic device of claim 11, wherein the wireless signals comprise a WiFi signal, and a feature dimension in which the delivery party detects the wireless signals comprises a WiFi fingerprint, and the WiFi fingerprint comprises a multipath structure of the WiFi signal and/or a signal strength of the WiFi signal.

* * * * *